United States Patent [19]

Kingsley

[11] 4,183,274

[45] Jan. 15, 1980

[54] ROLLER SCRIBER APPARATUS FOR SCRIBING GLASS

[75] Inventor: John T. Kingsley, Tempe, Ariz.

[73] Assignee: Motorola, Inc., Schaumburg, Ill.

[21] Appl. No.: 865,045

[22] Filed: Dec. 27, 1977

[51] Int. Cl.² .............................................. B26D 3/08
[52] U.S. Cl. ...................................... 83/886; 83/880; 33/32 R
[58] Field of Search ................... 83/12, 8, 7, 886, 879, 83/880; 33/32 R

[56] References Cited

U.S. PATENT DOCUMENTS

| | | | |
|---|---|---|---|
| 3,399,586 | 9/1968 | Insolio et al. | 83/8 |
| 3,459,078 | 8/1969 | Black | 83/8 |
| 4,027,562 | 7/1977 | Bonaddio | 83/8 |
| 4,083,274 | 4/1978 | Insolio et al. | 83/12 |

Primary Examiner—Donald R. Schran
Attorney, Agent, or Firm—Paul F. Wille

[57] ABSTRACT

Improved apparatus for scribing glass wherein the dimensional interference for entry is controlled, the force applied is nearly constant over a range of glass thicknesses and the scribing wheel is restrained within close tolerances to prevent wheel wobble and/or wander. The invention provides a very high quality fracture of the glass and allows separation to be delayed for at least as much as eleven months after scribing. Scribing may be accomplished in either of two pass directions.

4 Claims, 3 Drawing Figures

ROLLER SCRIBER APPARATUS FOR SCRIBING GLASS

FIELD OF THE INVENTION

The invention relates to improvement in apparatus for scribing thin sheets of glass.

BACKGROUND OF THE INVENTION

It is well known in the art to break glass by first scribing the surface with a sharp edged wheel made of a hard material such as tungsten carbide.

The tools which have been used for this purpose include wheels which are spring loaded in an attempt to provide a constant scribing force on the glass. An example of such a tool is disclosed in R. P. Detorre's U.S. Pat. No. 3,577,636. Tungsten carbide cutter wheels are disclosed, for example, in the Bier et al U.S. Pat. No. 3,756,104. The prior art also discloses mechanisms for reducing or controlling the interference between the sheet of glass and the cutting wheel at the point of entry of the wheel. Insolio's U.S. Pat. No. 3,276,302, for example, discloses the use of plastic wheels which serve to lift the cutter wheel in advance of actual entry onto the glass by the cutter wheel. In this way the interference dimension is controlled to a predetermined point. Absent this sort of control, the entry edge of the glass sheet will either be damaged by chipping or cracking or the scoring will not be of a proper depth at the glass edge to ultimately produce a clean fracture. Insolio's patent, supra, also teaches the use of dual plastic guide wheels for allowing scribing in either of two directions.

It is well known in the art that a scribed sheet of glass exhibits a healing characteristic which becomes more pronounced as time passes after the scribing operation. It is generally necessary to complete the glass cutting operation by fracturing within one-half hour of the scribing operation in order to produce reasonable quality in the fracture.

SUMMARY OF THE INVENTION

The foregoing limitations and problems are overcome by the instant invention by, (1) providing a nearly constant cutting force on the cutter wheel, (2) holding cutter wheel wobble and transverse motion within very close dimensional limits and, (3) controlling dimensional interference at entry within close tolerances. The result is a much cleaner fracture of the glass sheet with no damage on entry, a scribing operation which appears to fracture the glass all the way through without physical separation of the glass unless it is so desired and gross reduction of the scribe healing phenomena.

It is therefore an object of the invention to produce a clean, square fracture of a sheet of glass by controlling cutter wheel wobble, cutter wheel force and cutter wheel interference dimension on entry.

It is another object of the invention to reduce entry edge damage to a sheet of glass in a scribing operation by controlling cutter wheel wobble, cutter wheel force and cutter wheel interference dimension on entry.

It is still another object of the invention to greatly extend the time period for healing of the scribe after scribing of a sheet of glass by controlling cutter wheel wobble, cutter wheel force and cutter wheel interference dimension on entry.

The invention will be more readily understood by a study of the detailed description of the invention together with FIG. 1 which illustrates the cutting mechanism of the invention in side view, FIG. 2 illustrates a head on view of a portion of the cutting mechanism of FIG. 1, and FIG. 3 shows the force/displacement characteristics of the spring of FIG. 1.

DETAILED DESCRIPTION OF THE INVENTION

Figure 1:
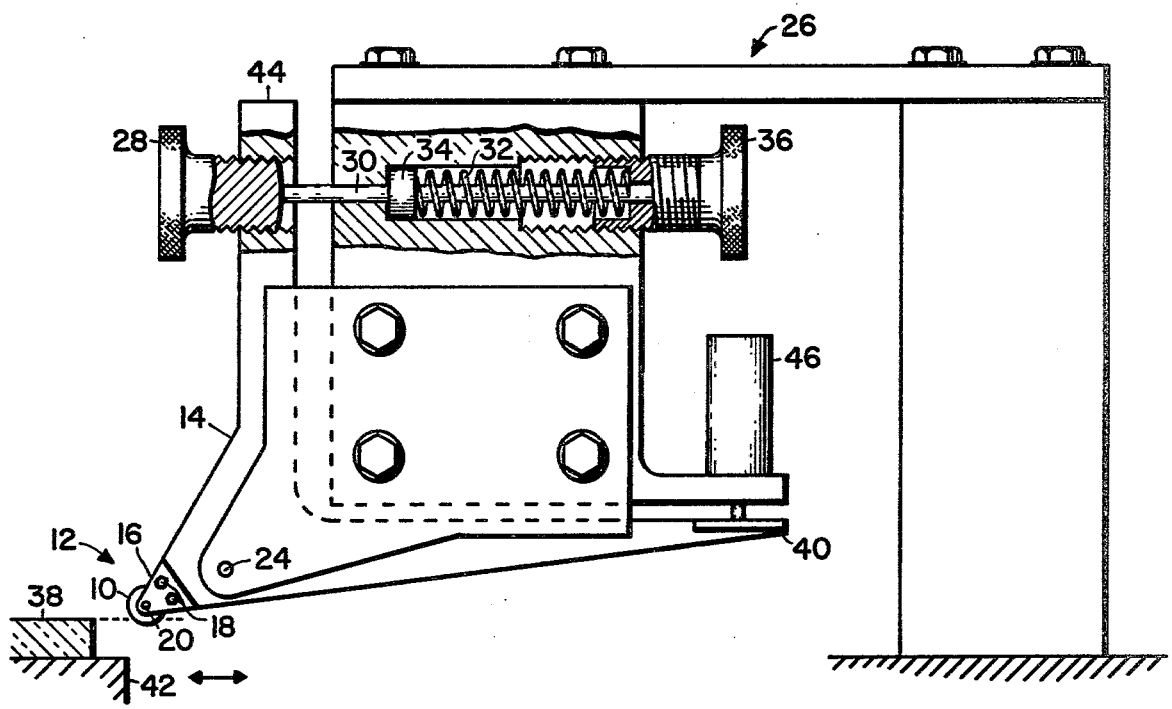
Figure 2:
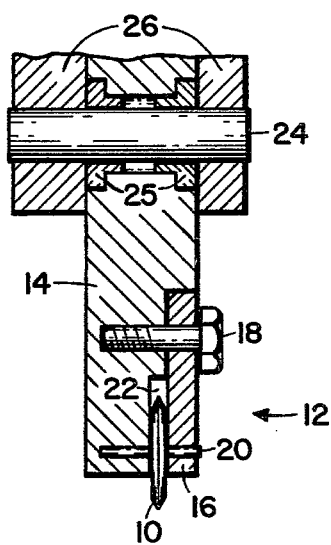

The objects of the invention are met by the preferred embodiment which is illustrated in FIG. 1. Cutting wheel 10, preferably made of tungsten carbide, is mounted in frame 12. Frame 12, as may be more readily seen from FIG. 2, comprises a portion of lever arm 14 and face plate 16. Face plate 16 is fastened to lever arm 14 by means of bolts 18 which have ground shanks for providing close tolerance positioning of face plate 16. Cutter wheel 10 is mounted on axle 20 which mounts in aligned holes in lever arm 14 and face plate 16. These holes are line bored for true alignment and axle 20 is ground for a precision fit. Slot 22 formed between face plate 16 and lever arm 14 is no more than 0.00025 inches wider than the maximum tolerance width of cutting wheel 10 which may be 0.042 plus 0.0000, minus 0.0002 inches wide. Thus, the transverse motion of cutting wheel 10 is limited to a maximum of 0.00045 inches within slot 22. This construction together with the dimensional tolerances serve to limit the wobble of cutting wheel 10 so that it is restrained between imaginary parallel planes spaced apart by no more than the width of cutting wheel 10 plus 0.00025 inches.

In the preferred embodiment of the invention, cutting wheel 10 is mounted in slot 22 formed by lever arm 14 and face plate 16. Lever arm 14 is a modified "L" shaped arm, as shown in FIG. 1. Cutting wheel 10 is mounted on a protrusion at the "L" intersection of lever arm 14. Lever arm 14 pivots on axle 24 which is mounted in frame assembly 26 on bearings 25. Bearings 25 help assure that spring 32 controls the force on scribing wheel 10 since bearings 25 reduce frictional forces. Frame 26 is constructed so that "L" shaped lever 14 may be limited to a maximum transverse motion within frame 26 of no more than 0.00045 inches. Thus the total transverse motion of wheel 10 is limited to 0.00090 inches. Upper end 44 of "L" shaped lever arm 14 has threaded control 28 threaded therein. An end of threaded control 28 bears on an end of force control rod 30. Force control rod 30 is spring loaded by compression spring 32 which bears on shoulder 34 of force control rod 30 and on the inner recessed surface of force control knob 36. Control knob 36 is threaded into a portion of frame assembly 26 and may be used to adjust the initial compression displacement of spring 32.

In operation, glass sheet 38 is placed on conveyor mechanism 42 and control 28 is set to minimize the interference dimension between cutting wheel 10 and glass sheet 38. That is, if the glass thickness tolerance is plus or minus 0.004 inches from a nominal thickness, control 28 is set to provide a wheel 10 position that would be tangent to a minimum tolerance glass sheet; wheel 10 would be set 0.004 inches below the nominal glass thickness surface height. Because glass sheet 38 thickness never reaches this minimum in actual practice, there is always some interference between wheel 10 and glass 38 upon entry of the wheel onto the glass. But this procedure minimizes the interference dimension thus reducing wheel 10 forces parallel to the surface of glass 38 and maximizes the force perpendicular to glass 38. The end result is much reduced damage to the glass at entry. Since lower leg 40 of lever arm 14 has more mass than that part of lever arm 14 assembly which is on the other side of pivot 24, upper leg 44 and control 28 are held against force rod 30 by the force of gravity.

Figure 3:
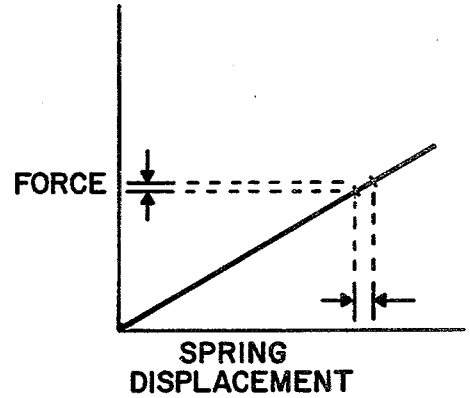

Upon entry of glass sheet 38 under cutting wheel 10, control 28 forces rod 30 to the right thereby further compressing spring 32. This further compression is called differential compression. Since the spacing between axle 20 and pivot point 24 is one fifth the spacing between pivot point 24 and the axis of control 28, spring 32 is differentially compressed by about five times the upward dimensional movement of cutter wheel 10. However, since cutter wheel 10 moves in the range of 0.004 inches, due to an undefined scribe depth in glass sheet 38 and the tolerance of glass thickness, spring 32 is differentially compressed about four times 0.004 inches or about 0.020 inches. Since, in the preferred embodiment of the invention, compression spring 32 is about 2.5 inches long, the compression amounts to only 0.80 percent of the initial length of the spring. As may be seen graphically from FIG. 3, this represents a corresponding very small change in force applied to upper leg 44 of "L" shaped lever arm 14. In fact, the force applied to upper leg 44 and hence to cutter wheel 10 may be assumed to remain constant even with variations in glass thickness due to nominal glass thickness tolerances. In the thin (0.20 to 0.60 inch) glass with which the invention has been used, the total tolerance range is plus or minus 0.004 inches.

Pneumatic cylinder 46, which may alternatively be an electric solenoid, is provided to lift cutter wheel 10 above glass 38 surface, if or when this is desired.

In practice, the invention has been used successfully to scribe glass from 0.020 to 0.060 inches thick. Cutter wheel forces are typically in the 10-12 pound range. Glass fracture has been delayed for as much as eleven months after scribing with a resultant high quality fracture still attainable. "High quality fracture" is a term which is difficult to define, but those skilled in the art have favorably compared the fractures attained by use of the described invention to the surface finishes provided by fire polishing the fractured glass edges. Cutter wheel life has been consistently recorded at three to four times wheel life observed on prior art scribers. It is also possible to set cutter wheel force high enough so that complete fracture occurs simultaneously with scribing where this is a desired result. Minimal increase in glass damage has been noted under these higher force conditions. Scribing may be accomplished in either of two directions of glass travel.

Glass feed rates have been optimized at one inch per second for entry and exit and at least five inches per second for scribing. Quality of fractures produced have been very uniform with clean square edges and no chipping or other damage at entry and exit points. The scribing process using the described embodiment of the invention does not include the use of any fluids or lubricants; the process is dry. High quality scribes may be accomplished in either direction of operation. Scribes made with the invention herein described are notable for their appearance: a fracture line consistently appears to extend completely through the thickness of the scribed glass but there is no separation unless the preset force is set high enough to produce that result.

Various modifications and changes may be made to the present invention based on the principles of the best mode embodiment described above without departing from the spirit and scope thereof as encompassed in the accompanying claims.

What is claimed is:

1. Scribing apparatus having a scribing wheel rotatably mounted on an axle and mechanical bias means for applying a force orthogonal to said axle wherein the improvement comprises:
   L-shaped means having a pivot at the apex thereof, said means comprising a vertically extending arm and a horizontally extending arm;
   said wheel being attached at the outside of said apex, on the opposite side of said pivot from said horizontally extending arm;
   said bias means coupled to the end of said vertically extending arm for controlling the force on said wheel and for counteracting the torque of said L-shaped member about said pivot; and
   means for controlling the maximum dimensional interference between the surface to be scribed and the perimeter of said wheel such that a plane parallel to said axle and tangent to said wheel is parallel to and below the nominal location of the surface to be scribed.

2. The scribing apparatus as set forth in claim 1 wherein said improvement further comprises:
   said mechanical bias means comprises an axially compressed spring characterized by a small differential compression by way of said said vertically extending arm to provide a substantially constant force on said wheel.

3. The scribing apparatus as set forth in claim 2 wherein said control means comprises a threaded shaft attached to said second arm and engaging said bias means.

4. The scriber as set forth in claim 13 wherein the distance from said pivot to said bias means is approximately five times the distance from said pivot to the axis of said wheel.

* * * * *